United States Patent Office 3,378,517
Patented Apr. 16, 1968

3,378,517
POLYETHER POLYURETHANES
Ulrich Knipp and Wolfram Neumann, Leverkusen, Albert Awater, Cologne-Mulheim, and Harald Oertel, Leverkusen, Germany, assignors to Farbenfabriken Bayer Aktiengesellschaft, Leverkusen, Germany, a German corporation
No Drawing. Filed Oct. 20, 1964, Ser. No. 405,256
Claims priority, application Germany, Oct. 25, 1963, F 41,097
3 Claims. (Cl. 260—45.9)

This invention relates to polyether polyurethanes and more particularly, to a method of stabilizing polyether polyurethanes against light and heat.

Fibers and threads prepared from high molecular weight polyether glycols are of particular importance because of their high resistance to hydrolytic degradation. However, these threads suffer the disadvantage that they are degraded when in the presence of light and heat thereby seriously reducing their physical properties with accompanying discoloration.

It is therefore an object of this invention to provide improved polyether polyurethane polymers. It is another object of this invention to provide a method of stabilizing polyether polyurethane polymers and fibers against the action of light and heat. It is still another object of this invention to provide polyether polyurethane fibers stabilized against the action of light and heat.

The foregoing objects and others which will become apparent from the following description are accomplished in accordance with the invention generally speaking, by providing polyalkylene ether polyurethane polymers stabilized against light and heat by subjecting the polymers to a stabilizing amount of an organic carbodiimide. Thus, the invention contemplates stabilized polymers and a method of preparing such polymers by contacting the polymers either in the solid state, melt or in solution with a stabilizing amount of a carbodiimide. Any polyalkylene ether polyurethane polymer can be stabilized against light and heat by the inclusion of a carbodiimide. These polymers can be prepared by reacting a polyalkylene ether with an organic polyisocyanate. The term "polyalkylene ether" includes not only substantially pure polyalkylene ethers but also polyalkylene thioethers, polyalkylene arylene ethers, polyalkylene arylene ether thioethers, polyalkylene ether esters and the like.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol, trimethyol propane, glycerine, pentaerythritol, hexanetriol, triodiglycol, 3,3'-dihydroxy propyl sulfide, 4,4'-dihydroxy butyl sulfide, 1,4-(β-hydroxy ethyl)phenylene dithioether, polyesters such as those prepared by reacting any of the alcohols named above with a polycarboxylic acid such as adipic acid, succinic acid, phthalic acid, terephthalic acid, fumaric acid, benzene tricarboxylic acid and the like. Any suitable alkylene oxide condensate may also be used such as, for example, the condensates of ethylene oxide, propylene oxide, butylene oxide, amylene oxide, styrene oxide and mixtures thereof. The polyalkylene ethers prepared from tetrahydrofuran may be used. The polyhydric polyalkylene ethers may be prepared by any known process such as, for example, the process described by Wurtz in 1859 and in the Encylopedia of Chemical Technology, volume 7, pages 257–262, published by Interscience Publishers in 1951 or in U.S. Patent 1,922,459. The molecular weight of such polyethers should be from about 500 to about 7500, preferably from about 700 to about 3000 and the melting point should be below about 60°. It is preferred that the polyether be linear.

Any suitable organic polyisocyanate may be used such as, for example, tetramethylene diisocyanate, hexamethylene diisocyanate, 1,4-phenylene diisocyanate, 1,3-phenylene diisocyanate, 1,4-cyclohexylene diisocyanate, 2,4-tolylene diisocyanate, 2,5-tolylene diisocyanate, 2,6-tolylene diisocyanate, 3,5-tolylene diisocyanate, 4-chloro-1,3-phenylene diisocyanate, 1-methoxy-2,4-phenylene diisocyanate, 1-methyl-3,5-diethyl-2,6-phenylene diisocyanate, 1,3,5-triethyl-2,4-phenylene diisocyanate, 1-methyl-3,5-diethyl-2,4-phenylene diisocyanate, 1-methyl-3,5-diethyl-6-chloro-2,4-phenylene diisocyanate, 6-methyl-2,4-diethyl-5-nitro-1,3-phenylene diisocyanate, p-xylylene diisocyanate, m-xylylene diisocyanate, 4,6-dimethyl-1,3-xylylene diisocyanate, 1,3-dimethyl-4,6-bis-(β-isocyanatoethyl)benzene, 3 - (α-isocyanatoethyl)phenylisocyanate, 1-methyl-2,4-cyclohexylene diisocyanate, 4,4'-biphenylene diisocyanate, 3,3'-dimethyl-4,4' - diphenylene diisocyanate, 3,3' - dimethoxy-4,4'-biphenylene diisocyanate, 3,3'-diethoxy-4,4'-biphenylene diisocyanate, 1,1'-bis-(4-isocyanatophenyl)cyclohexane, 4,4'-diisocyanatodiphenylether, 4,4'-diisocyanato - dicyclohexylmethane, 4,4' - diisocyanato-diphenylmethane, 4,4'-diisocyanato-3,3'-dimethyldiphenylmethane, 4,4'-diisocyanato-3,3'-dichlorodiphenylmethane, 4,4' - diisocyanatodiphenyl-dimethylmethane, 1,5-naphthylene diisocyanate, 4,4',4''-triisocyanato-triphenylmethane, 2,4,4'-triisocyanato-diphenylether, 2,4,6-triisocyanato-1-methyl-3,5 - diethylbenzene, o,o,o-tris(4-isocyanatophenyl)phosphorothioate and the like.

Any suitable carbodiimide may be used in a stabilizing amount in accordance with this invention such as, for example, aliphatic, cycloaliphatic, aromatic, mono- and polycarbodiimides such as, for example, aliphatic types such as diisopropyl-carbodiimide, methyl-tert.-butyl-carbodiimide, cycloaliphatic types such as dicyclohexyl-carbodiimide and aromatic types such as diphenyl-carbodiimide, di-p-tolyl-carbodiimide and di-(p-dodecylphenyl)-carbodiimide, substituted derivations of diphenyl-carbodiimide such as are obtainable, for example, according to German auslegeschrift 7,156,401 by the action of tertiary amines or metal compounds that are basic in reaction on aromatic monoisocyanates which carry one to two aryl-, alkyl-, aralkyl- or alkoxy substituents in the o-position to the NCO groups, wherein at least one of the substituents should contain at least two carbon atoms, have been found to be particularly advantageous, such as, for example, 2,2'-diethyldiphenyl-carbodiimide, 2,2'-diisopropyl-diphenyl - carbodiimide, 2,2' - diethoxydiphenyl-carbodiimide, 2,6,2',6'-tetraethyldiphenyl-carbodiimide, 2,6,2',6'-tetraisopropyl-diphenyl-carbodiimide, 2,6,2',6' - tetraethyl-3,3' - dichlorodiphenyl - carbodiimide, 2,2'-diethyl-6,6'-dichlorodiphenyl-carbodiimide, 2,6,2',6'-tetraisopropyl-3,3'-dinitrodiphenyl - carbodiimide and 2,4,6,2',4',6' - hexaisopropyldiphenyl-carbodiimide.

Polycarbodiimides such as, tetramethylene-ω,ω'-bistertiary-butyl-carbodiimide, hexamethylene - ω,ω' - bis-tertiary-butyl-carbodiimide and polycarbodiimides which can be produced, for example, in accordance with the above-mentioned German auslegeschrift from aromatic di- and polyisocyanates, for example, from 1,3-diisopropyl-phenylene-2,4-diisocyanate, 1-methyl-3,5-diethyl-phenylene-2,4-diisocyanate, 1,3,5 - triethylphenylene - 2,4-diisocyanate, 1,3,5 - triisopropyl - phenylene-2,4-diisocyanates, 3,3'-diethyl - diphenyl-4,4'-diisocyanate, 3,5,3',5'-tetraethyl-diphenylmethane-4,4'-diisocyanate, 3,5,3',5'-tertaisopropyl-diphenylmethane - 4,4' - diisocyanate and 1,3,5-triethyl-benzene-2,4,6-triisocyanate and the like may be used. It is, of course, also possible to use mixtures of carbodiimides.

The process in accordance with this invention is particularly applicable to substantially linear polyether polyurethane polymers suitable for the preparation of elastomeric fibers and threads. Such polymers can be prepared by many suitable methods, the most practical and preferred method being set forth by the procedures numbered 1 through 4 which follow immediately hereafter.

(1) Polyether isocyanates (so-called prepolymers) are dissolved in an organic solvent such as toluene, chlorobenzene, dioxane, tetrahydrofuran and spun in a diamine, e.g. ethylene diamine, 1,4-diaminocyclohexane, 1,6-hexamethylenediamine or hydrazine or dihydrazine such as 1,6-hexamethylene-dihydrazine.

(2) Polyethers, polyisocyanates and chain lengthening agents, e.g. water, diols such as 1,4-butanediol, 1,6-hexanediol, hydroquinone - bis-hydroxyethylether, diamine such as ethylene diamine, 1,4-diaminocyclohexane, 1,6-hexamethylene diamine, N,N'-diamino piperazine, hydrazine, dihydrazines such as 1,6-hexamethylene-dihydrazine, and in addition, hydrazides such as carbohydrazide, adipic acid dihydrazide, 1,6-hexamethylene-bis-semicarbazide, butanediol-1,4-bis-carbazinic ester are reacted in a highly polar organic solvent which is capable of forming hydrogen bridges, such as dimethyl formamide, dimethylacetamide, dimethylsulphoxide, tetramethylenesulphone. The highly viscous compound is spun, the solvent evaporating at the same time.

(3) Polyethers and chain lengthening agents which contain predominantly terminal bifunctional OH groups, such as 1,4 - butanediol, 1,6-hexanediol, 2,3-dimethyl-propanediol-1,3 and hydroquinone-bis-hydroxyethyl ether are reacted in a single stage or two-stage process. The resulting mass of synthetic resin is granulated and formed into threads in heated extruders.

(4) An elastic polyurethane mass is cast into foils either from the melt or from solutions, and elastic threads are cut from these foils.

Elastomeric threads having excellent mechanical properties can be produced by the solvent spinning process, the reaction spinning process and the melt spinning process. The tensile strength and stress responses are very high compared with those of rubber threads. In accordance with the chemical structure, the resistance to solvents and to oil is excellent. However, elastic threads of polyether urethanes are also subject to aging due to light, especially UV light, weathering, heat and mechanical influences. This is often manifested in a drop in the mechanical values and in yellow discoloration. Another disadvantage is the greater permanent deformation compared with that of rubber threads. This is particularly apparent when the thread is exposed to elevated temperatures while under tension, i.e., in the stretched state. This invariably occurs in the so-called finishing of elastic fabrics and dyeing processes. In these processes, the fabric stretched to 100-200% is exposed to aqueous solutions reaching temperatures up to 100° C., in many cases for up to 2 hours. The aforesaid undesirable permanent deformation results in elongation and slackening of the fabric.

The polymers or threads may be treated with the carbodiimides by various techniques. One suitable method, for example is by after-treating the threads produced by the solvent spinning process with carbodiimides at elevated temperatures. The dressing of the threads with carbodiimides by an after-treatment may be carried out for example, at normal or elevated temperature by immersion in the liquid phase or by treatment in the gaseous phase. If the carbodiimides used for immersion are not themselves liquid, they may be liquified, e.g. by melting, or used in the form of solutions in the customary solvents, e.g. petroleum ether, light petrol, hexane, toluene, xylene, chlorobenzene, ethyl acetate, acetone, ether, methylglycol ether or methylglycol ether acetate. Temperatures between 40 and 180°, especially between 120 and 150° C. are preferably employed. The after-treatment is advantageously carried out for a time between one second and 30 minutes, preferably between 30 seconds and 5 minutes.

However, the stabilizing agent may equally well be added to the spinning solutions or to the starting components or intermediate stages of the reaction, and the subsequent forming of the article may be carried out by a dry spinning process. The thread to be stabilized should preferably contain the carbodiimide component in a stabilizing amount and preferably in a quantity of 0.1 to 10%.

As will be seen from the examples in which parts are by weight unless otherwise specified, the addition of carbodiimides effects marked improvement in the mechanical properties, for example in the elongation, the tensile strength and the stability to light.

Example 1

About 200 parts of a polytetrahydrofurandiol (OH number 105.7) are reacted with about 164 parts of toluylene-2,4-diisocyanate for about 45 minutes at about 98° C. and the reaction product is converted into a prepolymer (2.08% NCO) by treatment with about 424 parts of diphenylmethane-4,4'-diisocyanate in about 650 parts of chlorobenzene for about one hour at about 98° C.

About 2000 parts of this preadduct are introduced with vigorous stirring into a 70° C. solution of about 25 parts hydrazine hydrate in about 4950 parts dimethylformamide, and the viscous solution thus produced is pigmented with about 4.8% titanium dioxide (rutile) calculated on the solids content. This solution is converted into a highly elastic thread by the dry spinning process. This thread is (a) Exposed for about one-half hour to a temperature of about 100° at 100% and 200% elongation, (b) Stored at about 110° for about 15 hours, cooled and then exposed to a temperature of about 100° for about one-half hour at 100% and 200% elongation, (c) Stored for about one minute in 2,6,2',6'-tetraisopropyl-diphenyl carbodiimide heated to about 140° and the adhering carbodiimide is then washed off in an ether-acetone mixture. The thread pre-treated in this way is exposed to a temperature of about 100° for about one-half hour at 100% and 200% elongation, (d) Immersed for about 2 minutes in the unstretched state at about 140° in di-(p-dodecylphenyl)-carbodiimide. The carbodiimide adhering thereto is then washed off in an ether-acetone mixture. The thread treated in this way is exposed for about one-half hour to a temperature of 100° at 100% and 300% elongation.

After cooling, the thread is found to have the following permanent elongations after the pre-treatment indicated.

| | a | b | c | d |
|---|---|---|---|---|
| Permanent elongation of the thread stretched by 100% (percent) | 35 | 50 | 24 | 26 |
| Permanent elongation of the thread stretched by 200% (percent) | 140 | 143 | 53 | 58 |

In contrast to the after-treatment with carbodiimides at elevated temperature, simple tempering of the threads in air gives no improvement.

Example 2

About 180 parts of the solution of a polymer prepared according to Example 1 is introduced dropwise with vigorous stirring into a solution, heated to about 70°, of about 4.8 parts carbohydrazide, a viscous solution being thereby produced which is pigmented by the addition of about 11 parts of a 33% paste of titanium dioxide (rutile) and dimethylformamide. On adding about 0.82 parts hexanediisocyanate, the viscosity rises to 308 poises/20°.

A portion of the solution is treated with about 3% 2,6,2',6'-tetraisopropyl-diphenyl - carbodiimide calculated on the solids content of the solution, and foils are cast from this solution and, for comparison, from the solution containing no additive. After drying (about one hour at about 100°, about one hour at about 130°), the films, which are about 0.15 mm. in thickness, are cut up into threads and exposed to light in a fadeometer. The following properties are measured (A without, B with additive; exposure time 0, 20, 40, 60, 80 hours):

| | A | | | | |
|---|---|---|---|---|---|
| | 0 | 20 | 40 | 60 | 80 |
| Tensile strength (g./den.) | 0.66 | 0.56 | 0.37 | 0.14 | |
| Elongation (percent) | 785 | 716 | 604 | 432 | |
| Tensile strength calculated on the titre at rupture | 5.81 | 4.55 | 2.58 | 0.72 | |
| Percent of original strength | 100 | 78 | 44 | 12 | |

| | B | | | | |
|---|---|---|---|---|---|
| | 0 | 20 | 40 | 60 | 80 |
| Tensile strength (g./den.) | 0.70 | 0.63 | 0.51 | 0.33 | 0.21 |
| Elongation (percent) | 776 | 692 | 655 | 610 | 500 |
| Tensile strength calculated on the titre at rupture | 6.14 | 5.10 | 3.86 | 2.36 | 1.26 |
| Percent of original strength | 100 | 83 | 71 | 39 | 21 |

The threads containing no carbodiimide undergo considerably more yellowing with increasing time of exposure to UV light than the threads stabilized with carbodiimide.

The $\eta_i$-value ($=ln\eta_{R/C} \cdot c=$g./100 cc., in hexamethyl phosphoramide/25°) of completely heated films (one hour at 130°) is slightly higher in the films containing carbodiimides than in the films without additive (1.02 as compared with 0.99).

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A polyalkylene ether polyurethane polymer stabilized against light and heat by having incorporated therein a stabilizing amount of an organic carbodiimide selected from the group consisting of aliphatic carbodiimides, aromatic carbodiimides, and cycloaliphatic carbodiimides.

2. The stabilized polyalkylene ether polyurethane polymer of claim 1 wherein the carbodiimide is a 2,2'-dialkyl diphenyl carbodiimide.

3. The stabilized polyalkylene ether polyurethane polymer of claim 1 wherein the carbodiimide is a 2,6,2',6'-tetra alkyl diphenyl carbodiimide.

References Cited

UNITED STATES PATENTS

| | | | |
|---|---|---|---|
| 3,085,991 | 4/1963 | Finelli | 260—45.95 |
| 3,105,094 | 9/1963 | Haeschele | 260—45.95 |
| 3,193,522 | 7/1965 | Neumann et al. | 260—45.9 |
| 3,193,523 | 7/1965 | Neumann et al. | 260—45.9 |
| 3,193,524 | 7/1965 | Holtschmidt et al. | 260—45.9 |
| 3,193,525 | 7/1965 | Kallert et al. | 260—45.9 |
| 3,170,896 | 2/1965 | Wagner et al. | 260—45.9 |
| 3,202,631 | 8/1965 | Fauser | 260—45.9 |

DONALD E. CZAJA, *Primary Examiner.*

L. J. BERCOVITZ, *Examiner.*

H. E. TAYLOR, JR., *Assistant Examiner.*